United States Patent [19]

Oates et al.

[11] Patent Number: 4,912,522
[45] Date of Patent: Mar. 27, 1990

[54] LIGHT DRIVEN REMOTE SYSTEM AND POWER SUPPLY THEREFOR

[75] Inventors: Robert M. Oates, Murrysville; Leonard C. Vercellotti, Oakmont; J. Richard Hansen, Wilkins Township, Allegheny County; Joseph C. Engel, Monroeville, all of Pa.

[73] Assignee: ASEA Brown Boveri Inc., Purchase, N.Y.

[21] Appl. No.: 232,982

[22] Filed: Aug. 17, 1988

[51] Int. Cl.⁴ ............................................. H04B 9/00
[52] U.S. Cl. .................................... 455/603; 455/605; 455/617
[58] Field of Search ............... 455/605, 619, 603, 606, 455/600, 607, 617

[56] References Cited

U.S. PATENT DOCUMENTS

| | | | |
|---|---|---|---|
| 4,023,887 | 5/1977 | Speers | 455/603 |
| 4,317,232 | 2/1982 | Pickett et al. | 455/606 |
| 4,346,478 | 8/1982 | Sichling | 455/605 |
| 4,479,264 | 10/1984 | Lockett et al. | 455/605 |
| 4,525,873 | 6/1985 | Baues | 455/600 |
| 4,525,874 | 6/1985 | Baues | 455/600 |
| 4,641,378 | 2/1987 | McConnell et al. | 455/619 |
| 4,710,927 | 12/1987 | Lemelson | 455/603 |
| 4,718,119 | 1/1988 | Salzer et al. | 455/619 |
| 4,724,315 | 2/1988 | Goerne | 455/619 |
| 4,731,879 | 3/1988 | Sepp et al. | 455/605 |

Primary Examiner—Benedict V. Safourek
Assistant Examiner—L. Van Beer
Attorney, Agent, or Firm—B. R. Studebaker

[57] ABSTRACT

A light driven remote system and power supply therefor that includes a laser diode that provides pulses of light to a fiber optic cable. The pulses of light are detected by a remote photodiode that is connected in parallel with a step-up transformer. The output of the step-up transformer is filtered to provide power for a remote system. Data transmission from the remote system is synchronized with transmission of light to the photodiode.

6 Claims, 5 Drawing Sheets

LIGHT DRIVEN REMOTE SYSTEM AND POWER SUPPLY THEREFOR

BACKGROUND OF THE INVENTION

The present invention relates to light powered systems, and in particularly, to light powered remote systems and a power supply therefor. In remote systems, a sensor is typically located remote from its power supply and from the device monitoring the sensor's output. In electrically noisy environments, this physical separation practically ensures that the power supplied to the sensor will be noisy, causing the sensor to operate in an unknown and unpredictable manner. As a result, the sensor's output may not accurately reflect the parameter being sensed. This problem is compounded because the output of the sensor must also be routed through the electrically noisy environment, causing further noise to be added to the sensor's output.

One approach to the noise problem is to employ a power supply located close to the sensor. An example of such a power supply is found in battery powered sensors. However, batteries have limited lifetimes. This makes batteries unacceptable for many applications.

Another approach uses a remote power supply together with fiber optics to route the sensor's output to the device monitoring the output. This approach, however, solves only half of the problem.

An additional approach eliminates the power supply altogether, and employs passive or electromechanical sensors. A fiber optic links the passive sensor to the device monitoring its output. Such passive sensors alter some property of light so that a parameter can be detected, i.e., transduced. These passive sensors, however, are expensive and can be used only to measure a limited number of parameters.

SUMMARY OF THE INVENTION

It is an object of the present invention to provide a light driven remote system for operation in an electrically noisy environment. It is another object of the present invention to provide a remote system driven by pulses of light.

It is a further object of the present invention to provide a light driven remote system using conventional sensors.

It is still another object of the present invention to provide a light driven remote system having sensors operated synchronously with pulses of light powering the system.

It is still a further object of the present invention to provide a light driven remote system having sensors transmitting data synchronously with pulses of light powering the system.

To achieve the above and other objects, the light driven remote system of the present invention comprises a light source means for providing pulses of light; a receiving means for receiving the pulses of light and for providing, a response to the pulses of light; a pulse signal having a magnitude; transform means for increasing the magnitude of the pulse signal and for providing a pulse supply signal that varies in accordance with the increased magnitude of the pulse signal; and a filter means for receiving and filtering the pulse supply signal and for providing an output responsive to the filtered pulse supply signal.

In a preferred embodiment of the present invention, the light source means can comprise a laser diode driven at, for example, a 50% duty cycle. The receiving means can comprise, for example, a fiber optic cable and a photodiode. In a preferred embodiment of the present invention, the transform means can comprise a transformer connected in parallel across the photodiode, and the filter means can comprise a simple diode/capacitor network that filters the output of the transformer and provides a small d.c. output.

DESCRIPTION OF THE PREFERRED EMBODIMENTS

Figure 1:
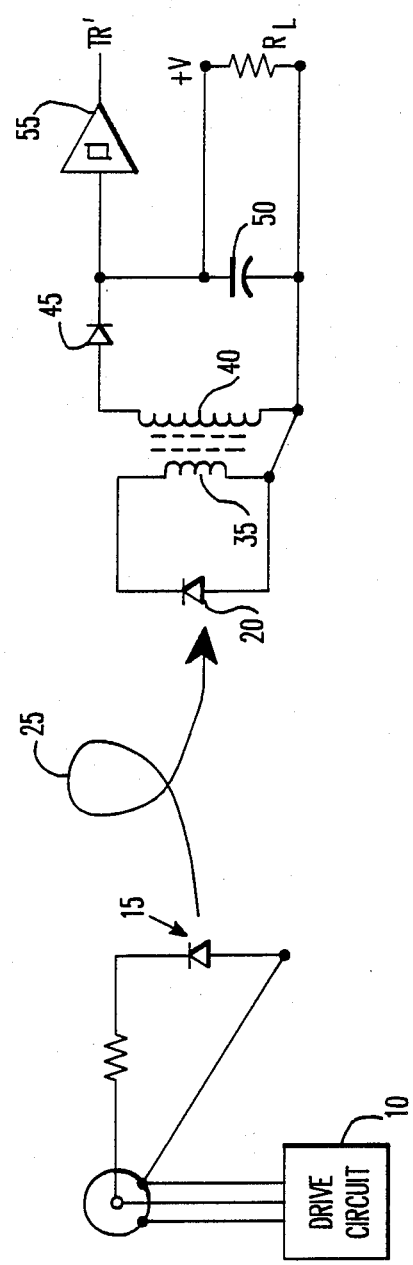
FIG. 1 is a schematic diagram of an embodiment of a power supply in accordance with the present invention.

FIG. 1 is a block diagram of an embodiment of a power supply in accordance with the present invention. In FIG. 1, a drive circuit 10 drives a laser diode 15, causing the laser diode 15 to emit light. The drive circuit 10 can drive the laser diode 15 with a 50% duty cycle pulse, having a frequency of 8 Khz, and a 90 ma peak. This particular drive is, of course, only an example, and other drive signals can be used. Light from the laser diode 15 illuminates the photodiode 20. I the embodiment shown in FIG. 1, a fiber optic cable 25 optically connects the photodiode 20 with the laser diode 15.

A step-up transformer 30 has a primary coil 35 connected in parallel with the photodiode 20. Since the laser diode 15 is driven with a signal having less than a 100% duty cycle, pulses of light are provided to the photodiode 20. The photodiode 20 detects the pulses of light and generates current pulses in the loop comprising the photodiode and the primary coil 35. The transformer 30 transforms the voltage across the photodiode 20 so that a larger voltage appears across a secondary coil 40 of the transformer 30. The voltage and current induced in the secondary coil 40 by the photodiode 20 is filtered by a circuit comprising a diode 45 and a capacitor 50 that are connected in parallel across the secondary coil 40.

The laser diode shown in FIG. 1 can comprise, for example, a laser diode manufactured by Mitsubishi and having part number 6101. The fiber optic cable can be a 400 um fiber. The photodiode 20 shown in FIG. 1 can comprise a photodiode manufactured by Hamamatsu and having a model number S874-18K. The transformer in FIG. 1 can have a ratio of primary turns to secondary turns in the order of 1:12.5. The capacitor 50 can have a capacitance of 1 $\mu$F.

Figure 2:
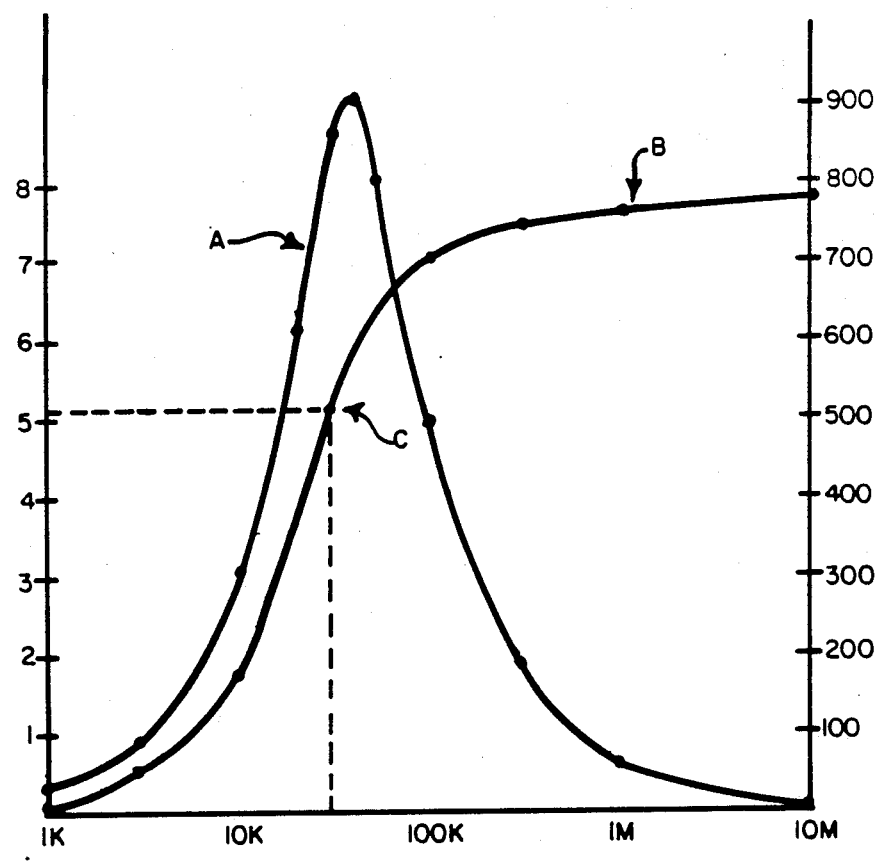
FIG. 2 is a graph of the output of the power supply shown in FIG. 1.

FIG. 2 is a graph of the output of the power supply system shown in FIG. 1. In FIG. 2, waveform A represents the power in a load (identified by the right hand ordinate ledged) versus the resistance of a load. Waveform B represents the d.c. voltage across a load resistance (identified by the left hand ordinate legend) versus the resistance of a load. Referring to FIG. 2, at the point C, with 5 volts across a load resistance of 30 Kohm, a current of 170 $\mu$A flows through resistance.

With reference to waveform A, it is seen that the 5 volts across the load with a resistance of approximately 30 Kohm provides a near maximum power in the load.

A trigger signal (TR) is provided by the drive circuit shown in FIG. 1. The trigger signal (TR) is provided in synchronism with pulses of light being generated by drive circuit 10.

A Schmitt trigger or comparator 55 is connected to the output of the supply also shown in FIG. 1. The Schmitt trigger detects the magnitude of the output voltage and provides another trigger (TR$^1$) signal when the output voltage reaches a specified value. The Schmitt trigger/comparator 55 need not be employed, but does provide the advantage of being able to synchronize operation of the circuitry driven by the power supply with reception of light by the power supply.

Figure 3:
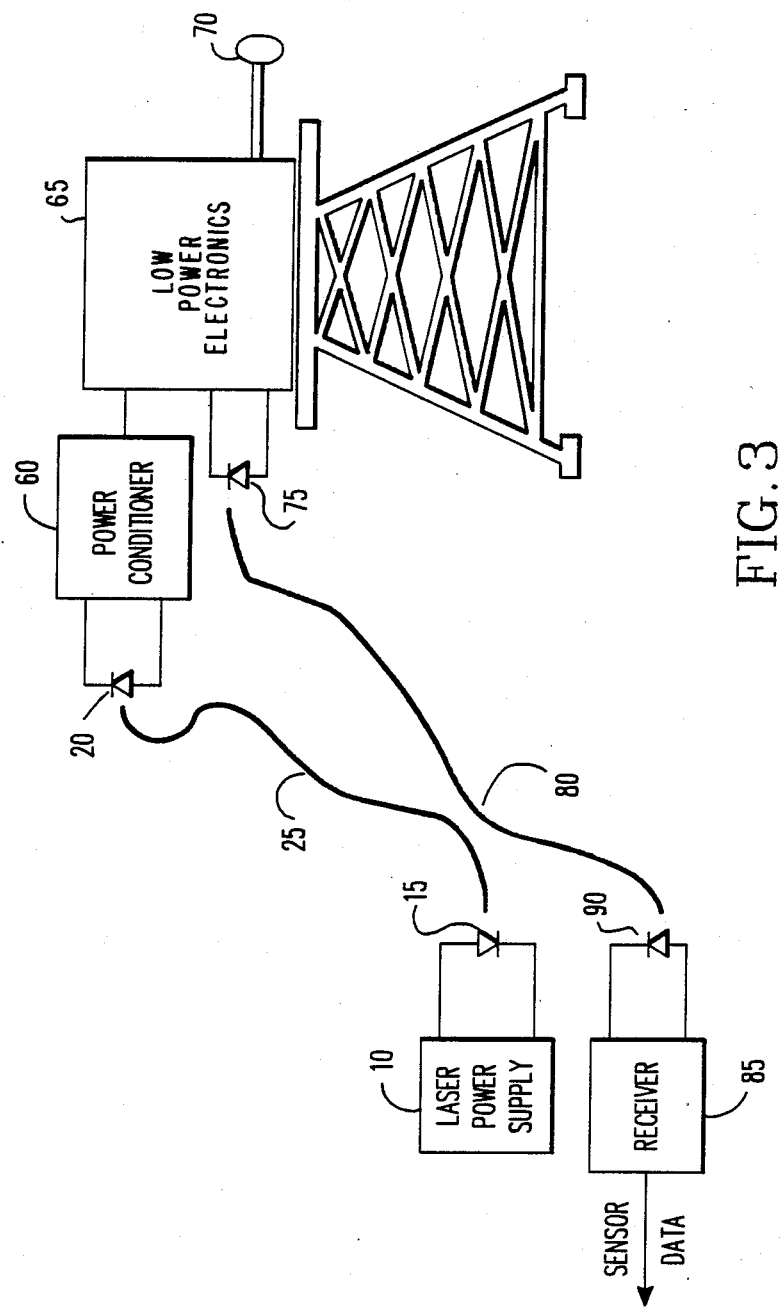
FIG. 3 is a schematic block diagram of a remote system embodying the present invention.

FIG. 3 is a schematic block diagram of a remote system embodying the present invention. In FIG. 3, the laser diode 15 transmits light pulses through the fiber optic cable 25 to the photodiode 20. A power conditioner 60 corresponds to, for example, the transformer 30, diode 45 and capacitor 50 shown in FIG. 1. The power conditioner 60 drives low power electronics 65. A conventional sensor 70 is connected to the low power electronics 65. The low power electronics senses a parameter of the sensor (e.g., resistance) and drives a light emitting diode 75 in accordance with changes in the sensed parameter. The light emitting diode 75 transmits narrow pulses of light, having a period proportional to the sensed parameter, over a fiber optic cable 80 to a receiver 85 that includes a photodiode 90. The light pulses are kept as narrow as possible with respect to the overall period so that the power draw from the supply is minimized while still maintaining the ability to detect the pulses. A typical pulse width would be in the range of 1% to 5% of the period.

In the system of FIG. 3, the power conditioner 60 is not affected by the electrical noise of the hostile environment since it is driven by pulses of light supplied by the fiber optic cable 25. In addition, the signal that varies in accordance with the sensed parameter is not affected by the electrically hostile environment because it too is transmitted from the remote system to the receiver 85 over the fiber optic cable 80.

Figure 4:
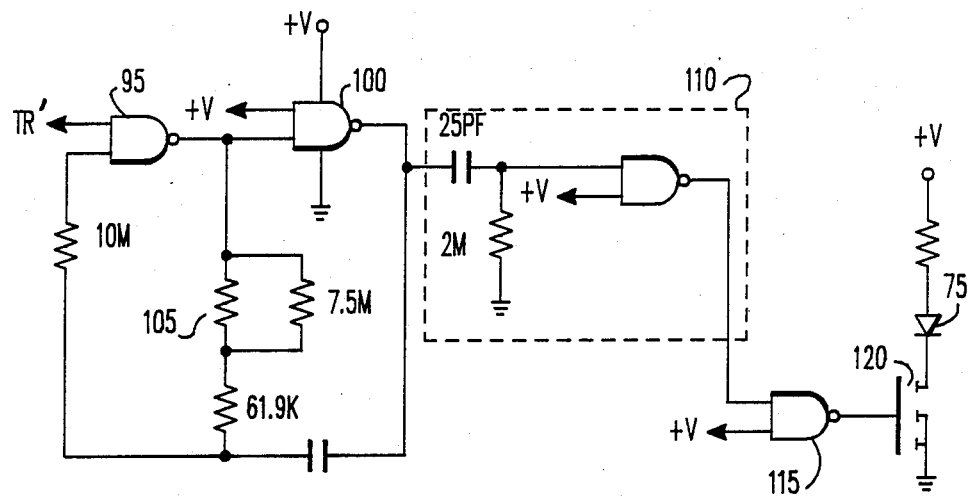
FIGS. 4 and 5 are schematic diagrams of portions of the FIG. 3 system.

FIG. 4 is a schematic diagram of an embodiment of the low power electronics 65 shown in FIG. 3. In FIG. 4, NAND gates 95 and 100 are connected to form an oscillator. Variations in the resistance of a temperature sensor 105 cause the frequency of the oscillator to vary. The output of the oscillator is applied to a wave shaping circuit 110. The wave shaping circuit 110 provides a narrow pulse to a NAND gate 115. The NAND gate 115 drives a transistor 120 that controls emission of light by the photodiode 75. The frequency of light pulses provided by photodiode 75 varies in accordance with the resistance of the temperature sensor 105.

Figure 5:
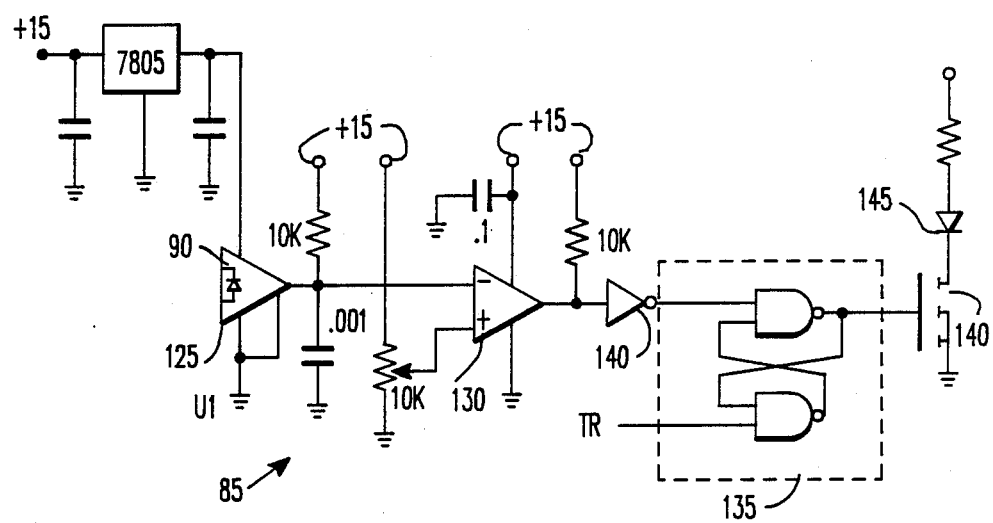

FIG. 5 is a schematic block diagram of an embodiment of the receiver 85 and photodiode 90 shown in FIG. 3. In FIG. 5, a photodiode receiver 125 includes the photodiode 90 shown in FIG. 3. The photodiode receiver can comprise part No. HFBR2402 manufactured by Honeywell. The output of the photodiode receiver 125 is applied to a comparator 130. The output of the comparator 130 drives a set/reset flip-flop 135 through an inverter 140. The other input of the set/reset flip-flop 135 (TR) is supplied by the laser power supply 10 shown in FIG. 1. The output of the set/reset flip-flop 135 corresponds to the sensor data shown in FIG. 3. In the embodiment of FIG. 5, the sensor data drives a transistor 140 which control the illumination of an LED 145. The pulse width of the LED light is proportional to the temperature sensed by the temperature sensor 105. Alternatively, the output of the set/reset flip-flop 135 could be applied to a processor and converted to temperature by way of, for example, a simple look-up table.

Since the set/reset flip-flop 135 is controlled by the timing signal (TR) from the laser power supply 10, the light signal from photodiode 75 that is responsive to the resistance of the temperature sensor 105, is synchronized with transmission of light pulses to the power conditioner 60 shown in FIG. 3. Synchronizing the transmission of light by the photodiode 75 with application of light pulses to the power conditioner 60 is optional. It is, however, efficient to synchronize these events in the manner described above where the light pulses applied to the power conditioner 60 function as both a power source and a timing reference. If such synchronization is not used the oscillator of FIG. 4 would be allowed to free run b eliminating the TR' connection, and the set-reset flip-flop 135 of FIG. 5 would not be used.

Figure 6:
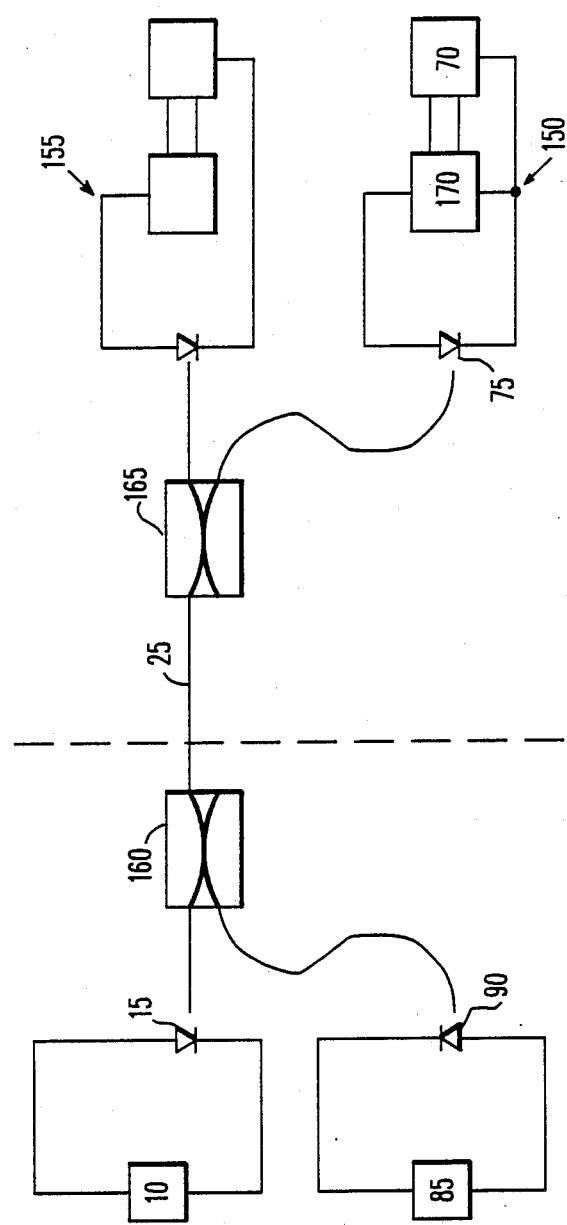
FIG. 6 is a schematic block diagram of another remote system of the present invention.

FIG. 6 is a schematic block diagram of another remote system embodying the present invention. In FIG. 6, a first remote system 150 and a second remote system 155 receive light pulses and transmit data over the fiber optic cable 25. The first and second systems (150, 155) are both driven by light travelling supplied by laser diode 15 via the fiber optic cable 25 and directional couplers 160 and 165. Similarly, light data transmitted by the first and second systems (150, 155) is routed to the photodiode 90 and receiver 85 via the directional couplers 160 and 165. While two remote systems are shown here the concept could be extended to include any number.

Since the first and second remote systems (150, 155) are identical, the following discussion refers only to the first remote system 150. Unlike the system shown in FIGS. 1 and 4, in FIG. 6, a transmitter/receiver logic circuit functions so that the LED 75 serve the purpose of receiving light from the laser driver 10, and transmitting light to the receiver 85. Using a photodiode in a dual capacity is known. An example of switching between receiving light pulses and transmitting data is to have the photodiode connected to the power conditioner most of the time. It normally receives codes which are superimposed on the pulsed light imposed on the fiber optic cable 25. When the remote system recognizes its code, the photodiode is switched to the transmit mode and the data is transmitted by means of pulses where frequency is related to the parameter being sensed.

By means of illustration only, a simple encoder/decoder system can comprise the drive circuit 10 driving laser diode 15 with a greater than 50% duty cycle for enabling one of the systems (150, 155) and less than 50% duty cycle for enabling the remaining system (150, 155). For example, system 150 would have in the transmitter/receiver logic circuit 170 a filter coupled to a comparator which detects when the duty cycle of the received light pulses is less than 50%. The comparator output would drive a, for example, CMOS transmission gate to switch the diode 75 to the transmit mode from the receive mode when the duty cycle (e.g. average voltage) of the received light pulses is less than 50%. The directional couplers 160 and 165 shown in FIG. 6 can comprise, for example, part No. SM3C, manufactured by Canstar Communications.

What is claimed is:

1. A light driven remote system connectable to receive pulses of light from a light source and connectable to a sensor for sensing a parameter, comprising:

receiving means for receiving the pulses of light and for provided, in response to the pulses of light, a pulse signal having a magnitude, transform means for increasing the magnitude of said pulse signal and for providing a pulse supply signal varying in accordance with the increased magnitude of said pulse signal;

filter means for receiving and filtering said pulse supply signal and for providing an output responsive to the filtered pulse supply signal;

low power means, operatively connected to and powered by the output of said filter means, for providing a signal varying in accordance with the parameter sensed by the sensor;

remote light source means, operatively connected to and powered by the output of said filter means, for providing light in accordance with the sensed parameter; and flip-flop means, for synchronizing operation of said low power means and said remote light source means with the light source providing the light pulses to said receiving means.

2. A light driven remote system according to claim 1, wherein said receiving means comprises a photodiode.

3. A light driven remote system according to claim 2, wherein said transform means comprises a step-up transformer having a primary coil connected in parallel with said receiving means, and a secondary coil connected in parallel with said filter means.

4. A light driven remote system comprising:

laser diode means for providing pulses of light;

a fiber optic cable connected to guide said pulses of light;

a first photodiode connected to said fiber optic cable so as to provide a pulse signal responsive to said pulses of light;

a step-up transformer having a primary coil connected in parallel with said photodiode and a secondary coil;

a filter connected in parallel with said secondary coil and having an output;

a comparator connected to and powered by said output of said filter;

sensor means, having an electrical characteristic, for sensing a parameter and for varying the electrical characteristic in response to variations of the parameter;

oscillator means, operatively connected to said comparator and to said sensor means, for providing a frequency signal having a frequency varying in response to variations in the electrical characteristic;

a second photodiode operatively connected to said oscillator means so as to provide light pulses responsive to said frequency signal;

another fiber optic cable connected to guide the light pulses from said second photodiode; and a third photodiode connected to said another fiber optic cable so as to provide a light output responsive to the light pulses from said second photodiode.

5. A light driven remote system according to claim 4, wherein said laser diode means includes means for providing a timing signal, and said system further comprises:

flip-flop means, operatively connected to receive said output signal from said third photodiode and said timing signal, for providing an output in synchronism with said timing signal.

6. A light driven system comprising:

laser diode means for providing first pulses of light including a code and for providing a timing signal;

a fiber optic cable operatively connected to said laser diode means;

first directional coupler means, operatively connected between said laser diode means and said fiber optic cable, for providing said first pulses of light to said fiber optic cable and for receiving second pulses of light from said fiber optic cable;

second directional coupler means, operatively connected to said fiber optic cable, for receiving said first pulses of light from said fiber optic cable, and for providing said second pulses of light to said fiber optic cable;

a plurality of first photodiodes operatively coupled to said second directional coupler means;

a plurality of sensor means respectively coupled to corresponding ones of said plurality of first photodiodes;

a plurality of transmitter/receiver logic circuit means, respectively coupled to and powered by corresponding ones of said first photodiodes and respectively coupled to corresponding ones of said sensor means, for sensing said code, and for causing said first photodiodes to generate said second pulses of light in accordance with the sensing of said corresponding sensor means and said code;

a second photodiode connected to said first optical directional coupler so as to provide a signal responsive to said second pulses of light; and flip-flop means for synchronizing generation of said signal with said timing signal.

* * * * *